(12) United States Patent
Bolz et al.

(10) Patent No.: US 9,773,341 B2
(45) Date of Patent: Sep. 26, 2017

(54) RENDERING COVER GEOMETRY WITHOUT INTERNAL EDGES

(71) Applicant: NVIDIA CORPORATION, Santa Clara, CA (US)

(72) Inventors: Jeffrey A. Bolz, Austin, TX (US); Mark J. Kilgard, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 452 days.

(21) Appl. No.: 13/971,639

(22) Filed: Aug. 20, 2013

(65) Prior Publication Data

US 2014/0267386 A1  Sep. 18, 2014

Related U.S. Application Data

(60) Provisional application No. 61/786,045, filed on Mar. 14, 2013.

(51) Int. Cl.
*G09G 5/00* (2006.01)
*G06T 15/30* (2011.01)

(52) U.S. Cl.
CPC .................................. *G06T 15/30* (2013.01)

(58) Field of Classification Search
None
See application file for complete search history.

(56) References Cited

U.S. PATENT DOCUMENTS

| | | | | |
|---|---|---|---|---|
| 5,877,773 A * | 3/1999 | Rossin | ................... | G06T 15/30 345/621 |
| 6,765,575 B1 * | 7/2004 | Voorhies | ................. | G06T 11/40 345/441 |
| 6,879,324 B1 * | 4/2005 | Hoppe | .................. | G06T 17/205 345/419 |
| 7,088,368 B1 * | 8/2006 | Andrews | ............... | G06T 15/005 345/418 |

(Continued)

OTHER PUBLICATIONS

Laine et al., Clipless Dual-Space Bounds for Faster Stochastic Rasterization, Jul. 2011, ACM Transactions on Graphics, vol. 30, No. 4, Article 106.*

*Primary Examiner* — Anh-Tuan V Nguyen
(74) *Attorney, Agent, or Firm* — Artegis Law Group, LLP

(57) ABSTRACT

One embodiment of the present invention includes techniques for rasterizing geometries. First, a processing unit defines a bounding primitive that covers the geometry and does not include any internal edges. If the bounding primitive intersects any enabled clip plane, then the processing unit generates fragments to fill a current viewport. Alternatively, the processing unit generates fragments to fill the bounding primitive. Because the rasterized region includes no internal edges, conflation artifacts caused when the number of coverage samples per pixel exceeds the number of color samples per pixel may be reduced. In prior-art techniques, reducing such conflation artifacts typically involves increasing the number of color samples per pixel to equal the number of coverage samples per pixel. Consequently, the disclosed techniques enable rendering using (Continued)

algorithms that reduce the ratio of color to coverage samples, thereby decreasing memory consumption and memory bandwidth use, without causing conflation artifacts associated with cover geometries.

18 Claims, 6 Drawing Sheets

(56) References Cited

U.S. PATENT DOCUMENTS

| | | | | |
|---|---|---|---|---|
| 7,292,242 | B1 * | 11/2007 | Wittenbrink | G06T 15/30 345/421 |
| 7,420,557 | B1 * | 9/2008 | Moreton | G06T 15/30 345/427 |
| 7,466,322 | B1 * | 12/2008 | Moreton | G06T 11/40 345/620 |
| 7,773,092 | B1 * | 8/2010 | Heckbert | G09G 5/393 345/582 |
| 7,817,165 | B1 * | 10/2010 | Donham | G09G 5/363 345/611 |
| 8,004,522 | B1 * | 8/2011 | Toksvig | G06T 15/503 345/426 |
| 8,379,025 | B1 * | 2/2013 | Carr | G06T 15/005 345/419 |
| 9,317,622 | B1 * | 4/2016 | Zuromski | G06F 17/30905 |
| 2002/0030693 | A1 * | 3/2002 | Baldwin | G06T 15/30 345/620 |
| 2004/0227772 | A1 * | 11/2004 | Huang | G06T 11/40 345/622 |
| 2006/0109266 | A1 * | 5/2006 | Itkowitz | G06F 3/016 345/419 |
| 2008/0062197 | A1 * | 3/2008 | Bi | G06T 15/30 345/621 |
| 2008/0077880 | A1 * | 3/2008 | Oygard | G06F 3/0485 715/799 |
| 2008/0198168 | A1 * | 8/2008 | Jiao | G06T 15/005 345/506 |
| 2009/0002393 | A1 * | 1/2009 | Wang | G06T 15/30 345/620 |
| 2010/0194747 | A1 * | 8/2010 | Bronder | G06T 15/503 345/422 |
| 2011/0081075 | A1 * | 4/2011 | Adcock | G06K 9/00751 382/165 |
| 2011/0138295 | A1 * | 6/2011 | Momchilov | G06F 9/4445 715/740 |
| 2011/0285747 | A1 * | 11/2011 | Kilgard | G06T 11/203 345/613 |
| 2012/0293512 | A1 * | 11/2012 | Yang | G06T 15/30 345/420 |
| 2013/0088519 | A1 * | 4/2013 | Cristescu | G06T 3/40 345/667 |
| 2014/0043341 | A1 * | 2/2014 | Goel | G06T 1/00 345/501 |

* cited by examiner

RENDERING COVER GEOMETRY WITHOUT INTERNAL EDGES

CROSS-REFERENCE TO RELATED APPLICATIONS

This application claims benefit of the U.S. Provisional Patent Application having Ser. No. 61/786,045, filed on Mar. 14, 2013, which is hereby incorporated herein by reference.

BACKGROUND OF THE INVENTION

Field of the Invention

Embodiments of the present invention relate generally to graphics processing and, more specifically, to rendering cover geometry without internal edges.

Description of the Related Art

Path rendering is a style of resolution-independent 2-dimensional rendering, often called "vector graphics," that is the basis for a number of important rendering standards. Those standards include Postscript, Java 2D, Apple's Quartz 2D, OpenVG, PDF, TrueType fonts, OpenType fonts, PostScript fonts, HTML 5 Canvas, Scalable Vector Graphics (SVG) web format, Microsoft's Silverlight and Adobe Flash. for interactive web experiences, Microsoft's XML Specification (XPS), drawings in Office file formats including PowerPoint, Adobe Illustrator illustrations, and more.

In path rendering, a software application typically specifies a scene as a sequence of resolution-independent outlines, known as paths, that may be painted with constant colors, linear or radial gradients, or images. Many graphics processing units (GPUs) support rendering such paths through a two-pass rendering process known as "stencil-then-cover." First, in a path stenciling pass, the GPU generates a stencil buffer that indicates which samples (i.e., locations within each pixel) are covered by the path. Second, in a path covering pass, the GPU generates cover geometry for the path and shades the cover geometry with stencil testing enabled. Typically, the GPU implements the cover geometry with some sort of conservative bounding geometry, such as a bounding box (i.e., two triangles), a convex hull, or a similar construct. Because stencil testing is enabled during the path covering pass, the GPU discards any fragments that are not covered by the path and writes the surviving fragments to the color buffer as processed graphics data.

In some approaches to stencil-then-cover path rendering, the GPU maintains N coverage samples per pixel and M color samples per pixel, where N is greater than M. In operation, the GPU determines the coverage of the path at N coverage samples per pixel. Then, during the path covering pass, before the GPU performs blending and color write operations, the GPU reduces the number of coverage samples to the number of color samples. Notably, during this reduction operation, the GPU may select a group of N/M coverage samples associated with a single color sample and generate an opacity value for the color sample based on the proportion of the N/M coverage samples that are covered.

One limitation of this rendering approach is that internal edges in the cover geometry may introduce conflation artifacts. Such conflation artifacts are caused by conflating coverage with opacity when reducing the multiple coverage samples to the single color sample. In particular, the reduction conflates a Boolean concept with a fractional value. For example, suppose that there were 4 coverage samples corresponding to each color sample (N=4 and M=1), the background color were red, and the cover geometry were to include two triangles with a single diagonal shared edge. Further, suppose that two of the coverage samples associated with a particular color sample were covered by the first triangle, and two of the coverage samples associated with the particular color sample were covered by the second triangle. Upon rendering the first triangle, the GPU would assign an intermediate red-blue color to the particular color sample—a blend of 50% of the blue color associated with the first triangle and 50% of the red color associated with the background. Subsequently, upon rendering the second triangle, the GPU would assign a different shade of red-blue color to the particular color sample—a blend of 50% of the blue color associated with the second triangle and 50% of the intermediate red-blue color. Such background color bleeding would degrade the quality of the displayed image. In particular, a fraction of the red background color would be visible at the diagonal edge shared between the two triangles covering the path (as if they were not fully covered by the path.)

In one approach to reducing the conflation artifacts associated with the cover geometry, the number of color samples is increased to match the number of coverage samples. In such implementations, the coverage is maintained separately for each color sample as a Boolean value and is not conflated with opacity. Consequently, rendering cover geometry that includes internal edges does not introduce conflation artifacts. However, increasing the number of color samples increases both the memory consumption and the memory bandwidth used by the color buffer. Because both the local memory capacity of GPUs and the associated memory bandwidth is limited, any increase in either memory consumption or memory bandwidth use is generally undesirable.

Accordingly, what is needed in the art is a more effective approach to rendering cover geometry.

SUMMARY OF THE INVENTION

One embodiment of the present invention sets forth a method for rasterizing conservative geometry. The method includes defining a bounding primitive that covers a path and does not include any internal edges; determining whether the bounding primitive intersects any enabled clip plane included in a plurality of clip planes; and if the bounding primitive does intersect an enabled clip plane, then generating one or more fragments to fill a current viewport, or if the bounding primitive does not intersect an enable clip plane, then generating one or more fragments to fill the bounding primitive.

One advantage of the disclosed approach is that a processing unit may perform memory-efficient path rendering operations without introducing conflation artifacts that may be associated with cover geometry. Because the unclipped raster region includes no internal edges, the number of coverage samples per pixel may exceed the number of color samples without causing background bleeding in the displayed image. Consequently, the processing unit does not incur the increased memory consumption and memory bandwidth associated with prior-art techniques in which the number of color samples is increased to match the number of coverage samples.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
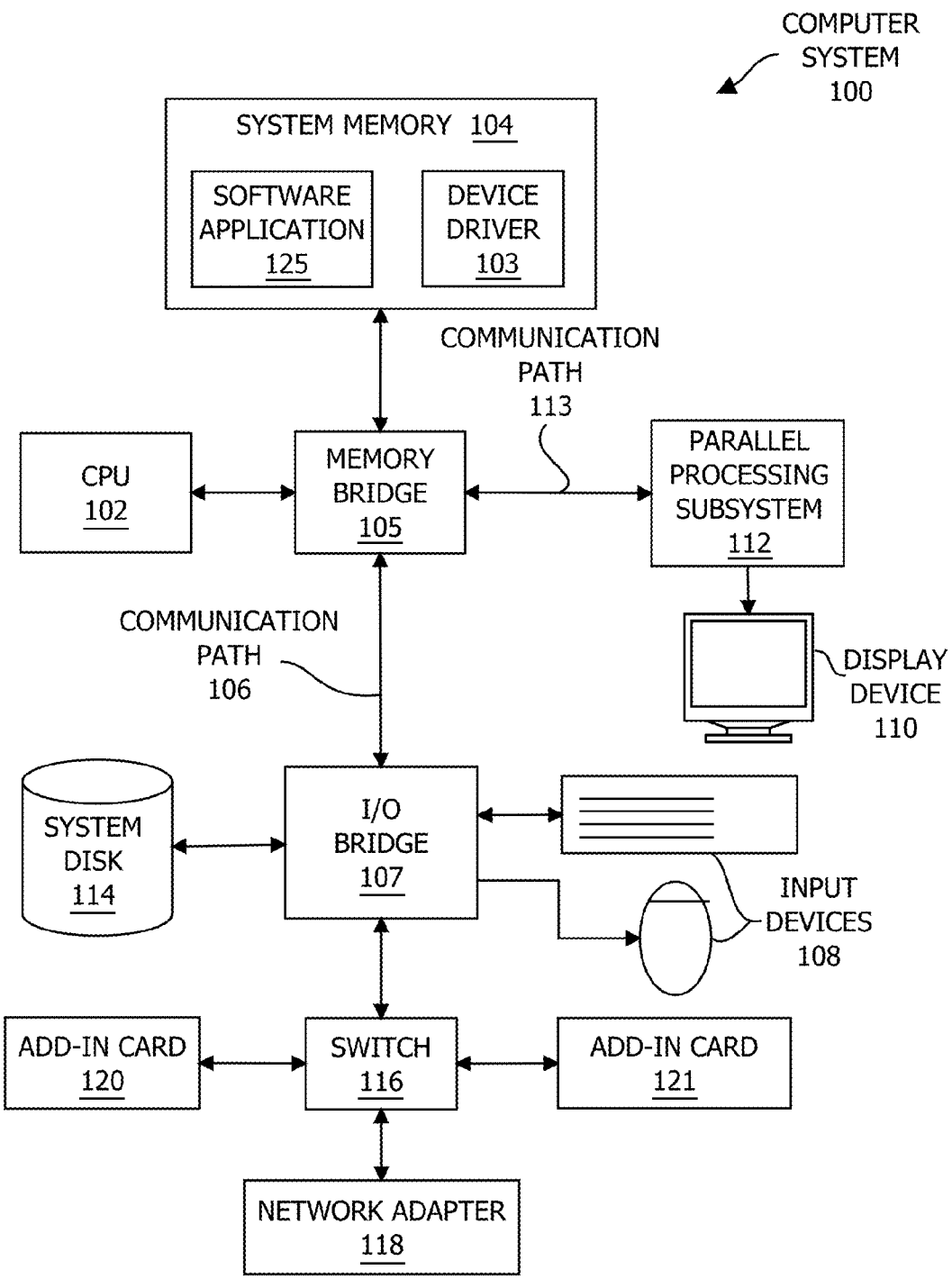
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbrige chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112. The system memory 104 also includes a software application 125 that executes on the CPU 102 and may issue commands that control the operation of the PPUs.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
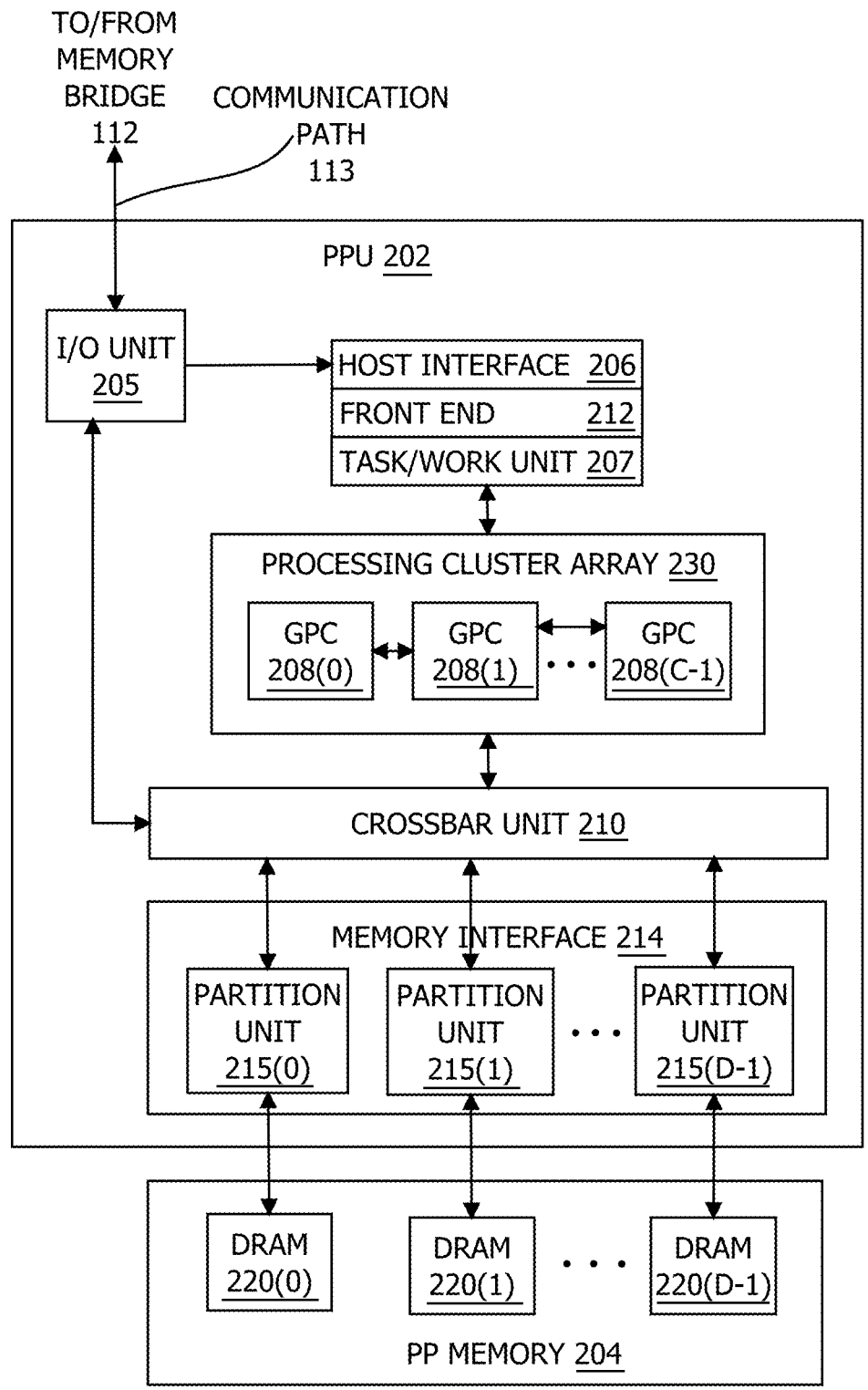
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where $D \geq 1$. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Graphics Pipeline Architecture

Figure 3:
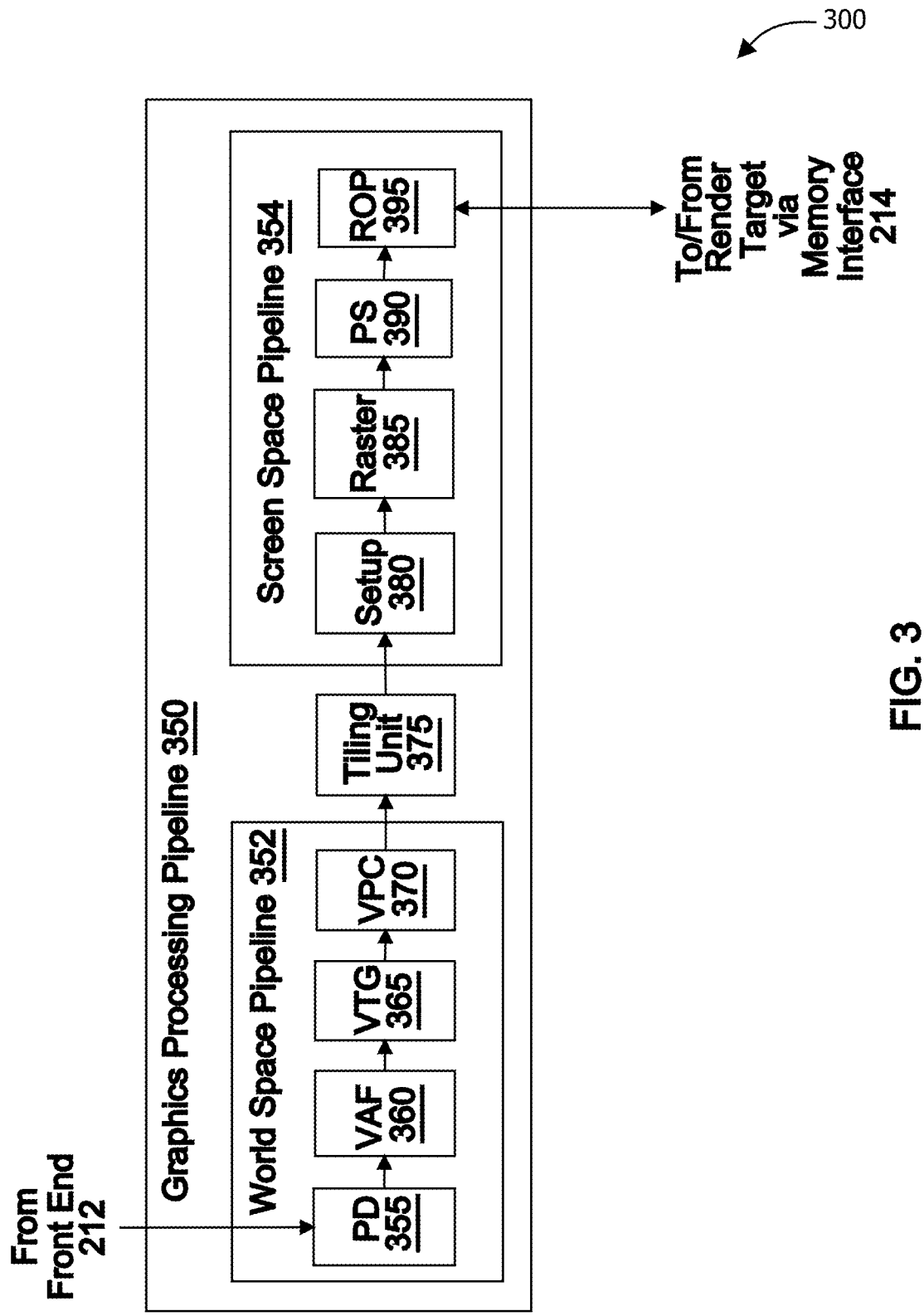
FIG. 3 is a conceptual diagram of a graphics processing pipeline that may be implemented within the parallel processing unit of FIG. 2, according to one embodiment of the present invention.

FIG. 3 is a conceptual diagram of a graphics processing pipeline 350 that may be implemented within PPU 202 of FIG. 2, according to one embodiment of the present invention. As shown, the graphics processing pipeline 350 includes, without limitation, a primitive distributor (PD) 355; a vertex attribute fetch unit (VAF) 360; a vertex, tessellation, geometry processing unit (VTG) 365; a viewport scale, cull, and clip unit (VPC) 370; a tiling unit 375, a setup unit (setup) 380, a rasterizer (raster) 385; a fragment processing unit, also identified as a pixel shading unit (PS) 390, and a raster operations unit (ROP) 395.

The PD 355 collects vertex data associated with high-order surfaces, graphics primitives, and the like, from the front end 212 and transmits the vertex data to the VAF 360.

The VAF 360 retrieves vertex attributes associated with each of the incoming vertices from shared memory and stores the vertex data, along with the associated vertex attributes, into shared memory.

The VTG 365 is a programmable execution unit that is configured to execute vertex shader programs, tessellation programs, and geometry programs. These programs process the vertex data and vertex attributes received from the VAF 360 and produce graphics primitives for further processing within the graphics processing pipeline 350. Although not explicitly shown, the VTG 365 may include, in some embodiments, one or more of a vertex processing unit, a tessellation initialization processing unit, a task generation unit, a task distributor, a topology generation unit, a tessellation processing unit, and a geometry processing unit.

The vertex processing unit is a programmable execution unit that is configured to execute vertex shader programs, lighting and transforming vertex data as specified by the vertex shader programs. For example, the vertex processing unit may be programmed to transform the vertex data from an object-based coordinate representation (object space) to an alternatively based coordinate system such as world space or normalized device coordinates (NDC) space. The vertex processing unit may read vertex data and vertex attributes that is stored in shared memory by the VAF and may process the vertex data and vertex attributes. The vertex processing unit stores processed vertices in shared memory.

The tessellation initialization processing unit is a programmable execution unit that is configured to execute tessellation initialization shader programs. The tessellation initialization processing unit processes vertices produced by the vertex processing unit and generates graphics primitives known as patches. The tessellation initialization processing unit also generates various patch attributes. The tessellation initialization processing unit then stores the patch data and patch attributes in shared memory. In some embodiments, the tessellation initialization shader program may be called a hull shader or a tessellation control shader.

The task generation unit retrieves data and attributes for vertices and patches from shared memory. The task generation unit generates tasks for processing the vertices and patches for processing by later stages in the graphics processing pipeline 350.

The task distributor redistributes the tasks produced by the task generation unit. The tasks produced by the various instances of the vertex shader program and the tessellation initialization program may vary significantly between one graphics processing pipeline 350 and another. The task distributor redistributes these tasks such that each graphics processing pipeline 350 has approximately the same workload during later pipeline stages.

The topology generation unit retrieves tasks distributed by the task distributor. The topology generation unit indexes the vertices, including vertices associated with patches, and computes (U,V) coordinates for tessellation vertices and the indices that connect the tessellated vertices to form graphics primitives. The topology generation unit then stores the indexed vertices in shared memory.

The tessellation processing unit is a programmable execution unit that is configured to execute tessellation shader programs. The tessellation processing unit reads input data from and writes output data to shared memory. This output data in shared memory is passed to the next shader stage, the geometry processing unit as input data. In some embodiments, the tessellation shader program may be called a domain shader or a tessellation evaluation shader.

The geometry processing unit is a programmable execution unit that is configured to execute geometry shader programs, thereby transforming graphics primitives. Vertices are grouped to construct graphics primitives for processing, where graphics primitives include triangles, line segments, points, and the like. For example, the geometry processing unit may be programmed to subdivide the graphics primitives into one or more new graphics primitives and calculate parameters, such as plane equation coefficients, that are used to rasterize the new graphics primitives.

The geometry processing unit transmits the parameters and vertices specifying new graphics primitives to the VPC 370. The geometry processing unit may read data that is stored in shared memory for use in processing the geometry data. The VPC 370 performs clipping, culling, and viewport transform to determine which graphics primitives are potentially viewable in the final rendered image and which graphics primitives are not potentially viewable. The VPC 370 then transmits processed graphics primitives to the tiling unit 375.

The tiling unit 375 is a graphics primitive sorting engine that resides between a world space pipeline 352 and a screen space pipeline 354, as further described herein. Graphics primitives are processed in the world space pipeline 352 and then transmitted to the tiling unit 375. The screen space is divided into cache tiles, where each cache tile is associated with a portion of the screen space. For each graphics primitive, the tiling unit 375 identifies the set of cache tiles that intersect with the graphics primitive, a process referred to herein as "tiling." After tiling a certain number of graphics primitives, the tiling unit 375 processes the graphics primitives on a cache tile basis, where graphics primitives associated with a particular cache tile are transmitted to the setup unit 380. The tiling unit 375 transmits graphics primitives to the setup unit 380 one cache tile at a time. Graphics primitives that intersect with multiple cache tiles are typically processed once in the world space pipeline 352, but are then transmitted multiple times to the screen space pipeline 354.

Such a technique improves cache memory locality during processing in the screen space pipeline 354, where multiple memory operations associated with a first cache tile access a region of the L2 caches, or any other technically feasible cache memory, that may stay resident during screen space processing of the first cache tile. Once the graphics primitives associated with the first cache tile are processed by the screen space pipeline 354, the portion of the L2 caches associated with the first cache tile may be flushed and the tiling unit may transmit graphics primitives associated with a second cache tile. Multiple memory operations associated with a second cache tile may then access the region of the L2 caches that may stay resident during screen space processing of the second cache tile. Accordingly, the overall memory traffic to the L2 caches and to the render targets may be reduced. In some embodiments, the world space computation is performed once for a given graphics primitive irrespective of the number of cache tiles in screen space that intersects with the graphics primitive.

The setup unit 380 receives vertex data from the VPC 370 via the tiling unit 375 and calculates parameters associated with the graphics primitives, including, without limitation, the color values, surface normal vectors, and transparency values at each vertex of the graphics primitive. The setup unit 380 then transmits processed graphics primitives to rasterizer 385.

The rasterizer 385 scan converts the new graphics primitives and transmits fragments and coverage data to the pixel shading unit 390. Additionally, the rasterizer 385 may be configured to perform z culling and other z-based optimizations.

The pixel shading unit 390 is a programmable execution unit that is configured to execute fragment shader programs, transforming fragments received from the rasterizer 385, as specified by the fragment shader programs. Fragment shader programs may shade fragments at pixel-level granularity, where such shader programs may be called pixel shader programs. Alternatively, fragment shader programs may shade fragments at sample-level granularity, where each pixel includes multiple samples, and each sample represents a portion of a pixel. Alternatively, fragment shader programs may shade fragments at any other technically feasible granularity, depending on the programmed sampling rate.

In various embodiments, the fragment processing unit 460 may be programmed to perform operations such as perspective correction, texture mapping, shading, blending, and the like, to produce shaded fragments that are transmitted to the ROP unit 395. The pixel shading unit 390 may read data that is stored in shared memory.

The ROP unit 395 is a processing unit that performs raster operations, such as stencil, z test, blending, and the like, and transmits pixel data as processed graphics data for storage in graphics memory via the memory interface 214, where graphics memory is typically structured as one or more render targets. The processed graphics data may be stored in graphics memory, parallel processing memory 204, or system memory 104 for display on display device 110 or for further processing by CPU 102 or parallel processing subsystem 112. In some embodiments, the ROP unit 395 is configured to compress z or color data that is written to memory and decompress z or color data that is read from memory. In various embodiments, the ROP unit 395 may be located in the memory interface 214, in the GPCs 208, in the processing cluster array 230 outside of the GPCs, or in a separate unit (not shown) within the PPUs 202.

The graphics processing pipeline 350 may be implemented by any one or more processing elements within PPU 202. For example, a streaming multiprocessor (not shown) within one of the GPCs 208 of FIG. 2 could be configured to perform the functions of one or more of the VTG 365 and the pixel shading unit 390. The functions of the PD 355, the VAF 360, the VPC 450, the tiling unit 375, the setup unit 380, the rasterizer 385, and the ROP unit 395 may also be performed by processing elements within a particular GPC 208 in conjunction with a corresponding partition unit 215. Alternatively, graphics processing pipeline 350 may be implemented using dedicated fixed-function processing elements for one or more of the functions listed above. In various embodiments, PPU 202 may be configured to implement one or more graphics processing pipelines 350.

In some embodiments, the graphics processing pipeline 350 may be divided into a world space pipeline 352 and a screen space pipeline 354. The world space pipeline 352 processes graphics objects in 3D space, where the position of each graphics object is known relative to other graphics objects and relative to a 3D coordinate system. The screen space pipeline 354 processes graphics objects that have been projected from the 3D coordinate system onto a 2D planar surface representing the surface of the display device 110. For example, the world space pipeline 352 could include pipeline stages in the graphics processing pipeline 350 from the PD 355 through the VPC 370. The screen space pipeline 354 could include pipeline stages in the graphics processing pipeline 350 from the setup unit 380 through the ROP unit 395. The tiling unit 375 would follow the last stage of the world space pipeline 352, namely, the VPC 370. The tiling unit 375 would precede the first stage of the screen space pipeline 354, namely, the setup unit 380.

In some embodiments, the world space pipeline 352 may be further divided into an alpha phase pipeline and a beta phase pipeline. For example, the alpha phase pipeline could include pipeline stages in the graphics processing pipeline 350 from the PD 355 through the task generation unit. The beta phase pipeline could include pipeline stages in the graphics processing pipeline 350 from the topology generation unit through the VPC 370. The graphics processing pipeline 350 performs a first set of operations during processing in the alpha phase pipeline and a second set of operations during processing in the beta phase pipeline. As used herein, a set of operations is defined as one or more instructions executed by a single thread, by a thread group, or by multiple thread groups acting in unison.

In a system with multiple graphics processing pipeline 350, the vertex data and vertex attributes associated with a set of graphics objects may be divided so that each graphics processing pipeline 350 has approximately the same amount of workload through the alpha phase. Alpha phase processing may significantly expand the amount of vertex data and vertex attributes, such that the amount of vertex data and vertex attributes produced by the task generation unit is significantly larger than the amount of vertex data and vertex attributes processed by the PD 355 and VAF 360. Further, the task generation unit associated with one graphics processing pipeline 350 may produce a significantly greater quantity of vertex data and vertex attributes than the task generation unit associated with another graphics processing pipeline 350, even in cases where the two graphics processing pipelines 350 process the same quantity of attributes at the beginning of the alpha phase pipeline. In such cases, the task distributor redistributes the attributes produced by the alpha phase pipeline such that each graphics processing pipeline 350 has approximately the same workload at the beginning of the beta phase pipeline.

Please note, as used herein, references to shared memory may include any one or more technically feasible memories, including, without limitation, a local memory shared by one or more streaming multiprocessors, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

Path Rendering

The software application 125 of FIG. 1 may configure the graphics processing pipeline 350 to perform various operations related to generating pixel data based on graphics data supplied by CPU 102 and/or system memory 104. In particular, the software application 125 may configure the graphics rendering pipeline 350 to perform operations related to path rendering. As outlined previously herein, path rendering is the basis for a number of important rendering standards, such as HTML 5 Canvas and SVG. In operation, the PPU 202 implements stencil-then-cover path rendering with N coverage samples per pixel and M color samples per pixel, where N is greater than M. In general, the software application 125 defines a path and configures the PPU 202 to perform stencil-the-cover path rendering as two sequential rendering passes—the path stenciling pass and the path covering pass.

In the path stenciling pass, the PPU 202 determines the coverage of the path at N coverage samples per pixel. For instance, the PPU 202 may determine the coverage of the path at 16 coverage samples per pixel. As part of the path stenciling rendering pass, the PPU 202 renders this coverage information to a stencil buffer. In the path covering pass, the PPU 202 covers the path with conservative cover geometry and shades the covered pixels. During this process, the PPU 202 reduces the number of coverage samples to the number of color samples. In some implementations, for each color sample, the PPU 202 identifies a group of N/M coverage samples that are associated with the color sample and generates an opacity value for the color sample based on the proportion of the N/M coverage samples that are covered. For instance, if the number of coverage samples per pixel is 16 and the number of color samples per pixel is 4, then the PPU 202 associates groups of 4 coverage samples with each color sample, and the possible opacity values are 0, 0.25, 0.5, 0.75, and 1.0. Notably, the PPU 202 uses the data included in the stencil buffer to discard any fragments that are not covered by the path. The PPU 202 then writes the surviving fragments to the color buffer as processed graphics data.

As outlined previously herein, because the PPU 202 reduces the multiple coverage samples to a single color sample, the PPU 202 may introduce conflation artifacts at internal edges. In particular, if the cover geometry includes internal edges, then the internal edges may incorrectly be visible in the rendered path. Advantageously, during the path covering pass, the PPU 202 is configured to generate cover geometry that does not include any internal edges. In particular, the PPU 202 is configured to generate a single bounding triangle to cover the path. By contrast, prior-art techniques may implement cover geometry as a bounding box with a diagonal internal edge, a hull that includes multiple internal edges, or similar constructs.

Further, as part of processing the cover geometry, the PPU 202 may clip the cover geometry to view frustum and user-defined clip planes, thereby generating undesirable internal edges. Advantageously, if the PPU 202 determines that the single bounding triangle intersects any enabled clip planes, then the PPU 202 directs the rasterizer unit 385 to generate fragments to fill the entire viewport instead of the bounding triangle. In this fashion, the PPU 202 eliminates conflation artifacts associated with clipping the cover geometry. By contrast, the cover geometry associated with prior-art techniques may be clipped by one or more enabled clip planes and then rendered. Consequently, such prior-art techniques may introduce conflation artifacts into the rendered path.

Figure 4:
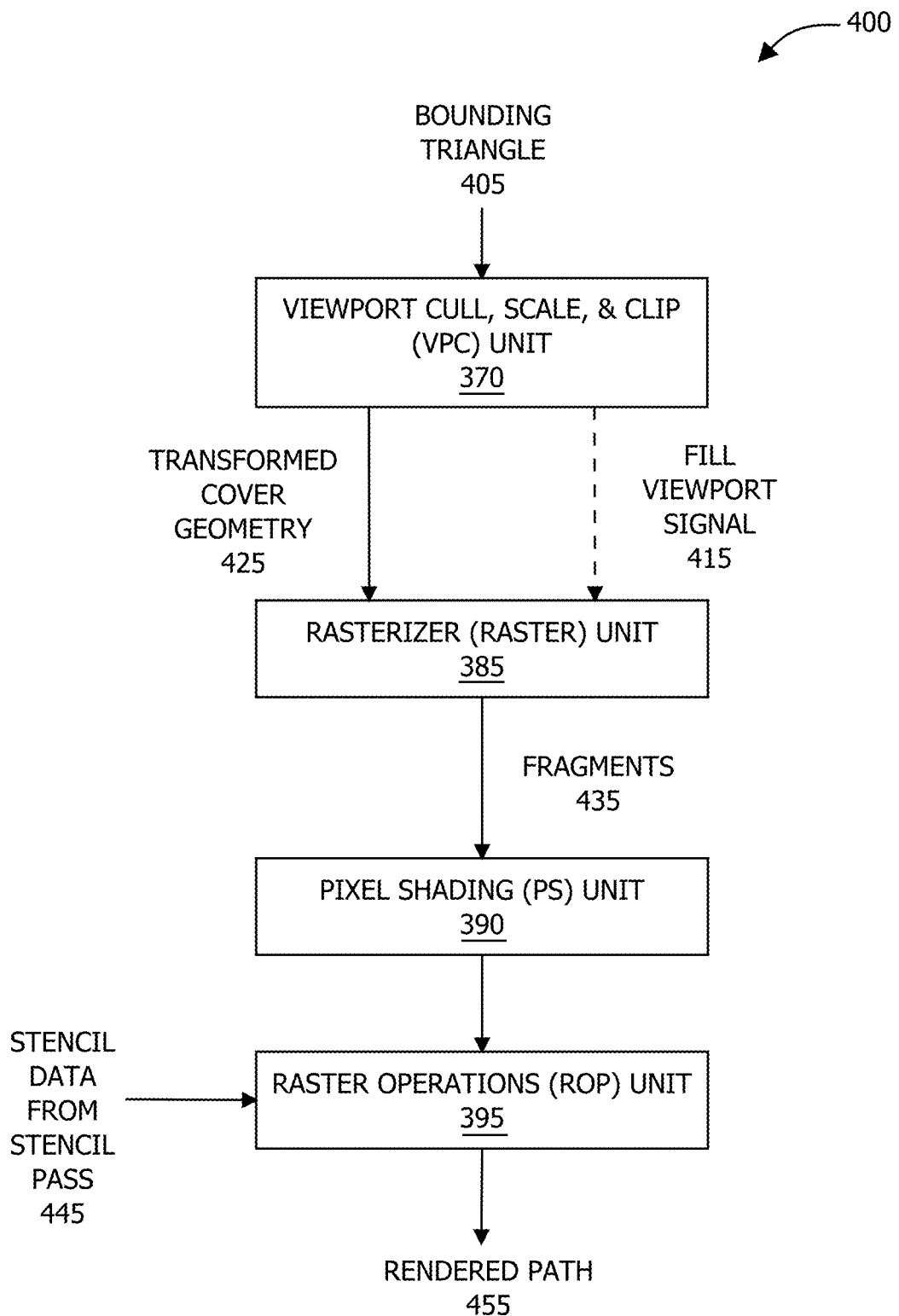
FIG. 4 is a conceptual diagram illustrating a path covering pass that the graphics processing pipeline of FIG. 3 may be configured to perform, according to one embodiment of the present invention.

FIG. 4 is a conceptual diagram illustrating a path covering pass that the graphics processing pipeline 350 of FIG. 3 may be configured to perform, according to one embodiment of the present invention. As previously disclosed herein, the PPU 202 is configured to perform stencil-then-cover path rendering. First, the PPU 202 performs the path stenciling pass (not shown,) thereby generating stencil data from stencil pass 445. Subsequently, the PPU 202 initiates the path covering pass by generating a bounding triangle 405 as the cover geometry.

As shown, the VPC unit 370 receives the bounding triangle 405 and generates a transformed cover geometry 425. More specifically, upon receiving the bounding triangle 405, the VPC unit 370 transforms each vertex of the bounding triangle 405 from path space to clip space. The VPC unit 370 may perform the transformation in any technically feasible fashion, using any model view and projection matrices. After performing the transformation, the VPC unit 370 determines whether the transformed cover geometry 425 crosses any enabled clip plane. If the transformed cover geometry 425 crosses an enabled clip plane, then the VPC unit 370 clips the transformed cover geometry 425 and one or more internal edges may be introduced. Advantageously, to avoid propagating any internal edges to a rendered path 455, if the VPC unit 370 detects conditions that lead to the clipping operation, then the VPC unit 370 sends a fill viewport signal 415 to the rasterizer unit 385. If the transformed cover geometry 425 does not cross an enabled clip plane, then the transformed cover geometry 425 corresponding to the bounding triangle 405 is not clipped, and the VPC unit 370 does not send the fill viewport signal 415 to the rasterizer unit 385.

To reduce the frequency of clipping, the PPU 202 includes clipless rasterizer support, and disables clip planes defined by x, y, and z coordinates. Consequently, only a single clip plane is enabled in the PPU 202—the w=0 clip plane. If the transformed covered geometry 425 corresponding to the bounding triangle 405 crosses the w=0 clip plane, then the w coordinate of at least one vertex included in the transformed covered geometry 425 is negative. In other words, a portion of the bounding triangle 405 lies "behind the eye" and is not visible. Again, in operation, if the VPC unit 370 determines that the transformed cover geometry 425 crosses the w=0 clip plane, then the VPC unit 370 sends the fill viewport signal 415 to the rasterizer unit 385. In alternate embodiments, the PPU may not include clipless rasterizer support and the PPU may be configured to detect additional conditions that may lead to clipping. For instance, the PPU may be configured to test the transformed cover geometry against multiple clip planes. Further, in alternate embodiments, the clipping test and clipping step may be performed by any unit or combination of units within the PPU.

In other embodiments, the VPC unit is not configured to send a fill viewport signal to the rasterizer unit. Instead, a graphics driver (not shown) conservatively estimates whether clipping may occur based on bounding cover geometry, the transformation matrices, and the enabled clip planes. If the graphics driver determines that clipping may occur, then the graphics driver defines the cover geometry as a full-viewport primitive or a full-frame primitive instead of the bounding triangle. Notably, the full-viewport primitive and the full-frame primitive support the same operations that the bounding triangle supports. In particular, all of these primitives support fragment shading, raster operations, blending, etc. Advantageously, because the full-viewport/full-frame primitive configure the rasterizer unit to fill the viewport with fragments, conflation artifacts associated with internal edges included in the cover geometry are not introduced. In addition, in some alternate embodiments, a scissor rectangle bounding the path in screen space limits the fragments generated by the rasterizer unit without generating internal edges.

Again, if the rasterizer unit 385 receives the fill viewport signal 415, then the rasterizer unit 385 generates fragments 435 to fill the viewport. Alternatively, if the rasterizer unit 385 does not receive the fill viewport signal 415, then the rasterizer unit 385 generates the fragments 435 to fill the transformed cover geometry 425. As shown, the rasterizer unit 385 passes the fragments 435 to the PS unit 390, which shades the fragments 435. Finally, the ROP unit 395 processes the fragments 435 with stencil testing enabled. As previously disclosed herein, before the ROP unit 395 performs blending and color write operations, the PPU 202 reduces the number of coverage samples to the number of color samples. Advantageously, since the PPU 202 does not generate internal edges associated with the cover geometry, this reduction operation does not produce conflation artifacts associated with the cover geometry. Further, because the ROP unit 395 performs stencil testing using the stencil data from stencil pass 445, the ROP unit 395 discards any fragments that are not covered by the path. Consequently, regardless of the extent of the region spanned by the fragments 435, the ROP unit 395 propagates only those fragments 435 that are covered by the path to the rendered path 455. In alternate embodiments, the PS unit may also read the stencil data from stencil pass as part of performing pixel shading.

Figure 5:
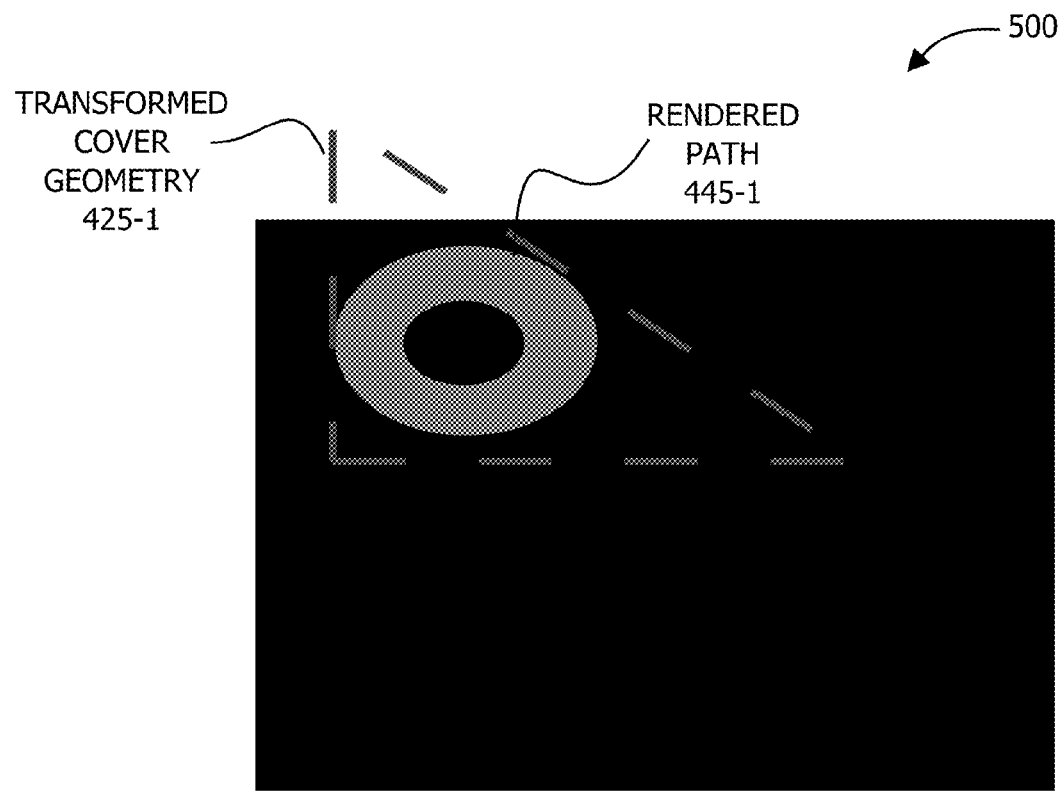
FIG. 5 is a conceptual diagram illustrating the rendered paths of FIG. 4, according to one embodiment of the present invention.
Figure 5:
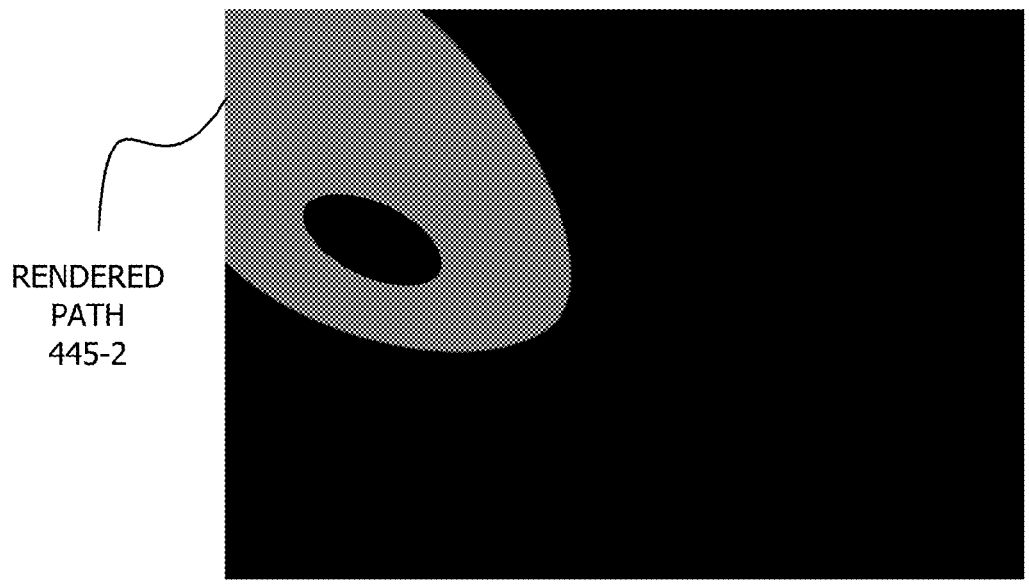

FIG. 5 is a conceptual diagram illustrating the rendered paths 455 of FIG. 4, according to one embodiment of the present invention. As shown, FIG. 5 depicts two rendered paths 445-1 and 445-2. Both of the rendered paths 445 correspond to a path defined in 2-D space as a solid-colored donut. However the rendered path 445-1 and the rendered path 445-2 correspond to two separate viewpoints, each of which depicts the donut path from a different perspective. More specifically, each viewpoint corresponds to a different set of model view and projection matrices.

As part of generating the rendered path 445-1, the PPU 202 defines the cover path geometry as a single bounding triangle 405 that conservatively covers the path defined by the donut. Again, the PPU 202 supports clipless rasterization, and the only enabled clip plane is the w=0 clip plane. The PPU 202 transforms the bounding triangle 405 to clip space based on the set of transformation matrices associated with the first perspective, thereby generating the transformed cover geometry 425-1. As shown, the transformed cover geometry 425-1 corresponding to the first perspective does not cross the w=0 clip plane. Consequently, the PPU 202 generates the fragments 435 to fill the transformed cover geometry 425-1. Finally, the PPU 202 generates the rendered path 445-1 in which the entire donut is visible.

Similarly, as part of generating the rendered path 445-2, the PPU 202 defines the cover path geometry as the single bounding triangle 445. Again, the bounding triangle 445 conservatively covers the path defined by the donut. The PPU 202 transforms the bounding triangle 405 to clip space based on the set of transformation matrices associated with the second perspective, thereby generating the transformed cover geometry 425-2 (not shown.) After the PPU 202 transforms the bounding triangle 445 to clip space, the PPU 202 determines that the transformed cover geometry 425-2 crosses the w=0 clip plane. Notably, portions of the donut path lie "behind the eye" in the second perspective. Consequently, the PPU 202 generates the fragments 435 to fill the entire viewport. Finally, the PPU 202 generates the rendered path 455-2 in which only a portion of the donut is visible.

Although the rendered paths 455 depicted in FIG. 5 are filled with a solid color, in alternate embodiments, input 2-D paths may be shaded in any technically feasible fashion. In some embodiments, attributes are assigned to vertices included in the cover geometry before the cover geometry is transformed. After the transformation, the attributes may be interpolated across any primitive (i.e., bounding triangle, full-viewport primitive, etc.) associated with the cover geometry and may be extrapolated outside the cover geometry to shade the final rendered path.

As persons skilled in the art will understand, embodiments of the invention include any techniques that ensure that no internal edges are generated based on the selection of cover geometry. Again, in prior-art techniques such edges may arise both from the initial choice of a cover geometry that includes multiple primitives and from clipping the cover geometry.

Figure 6:
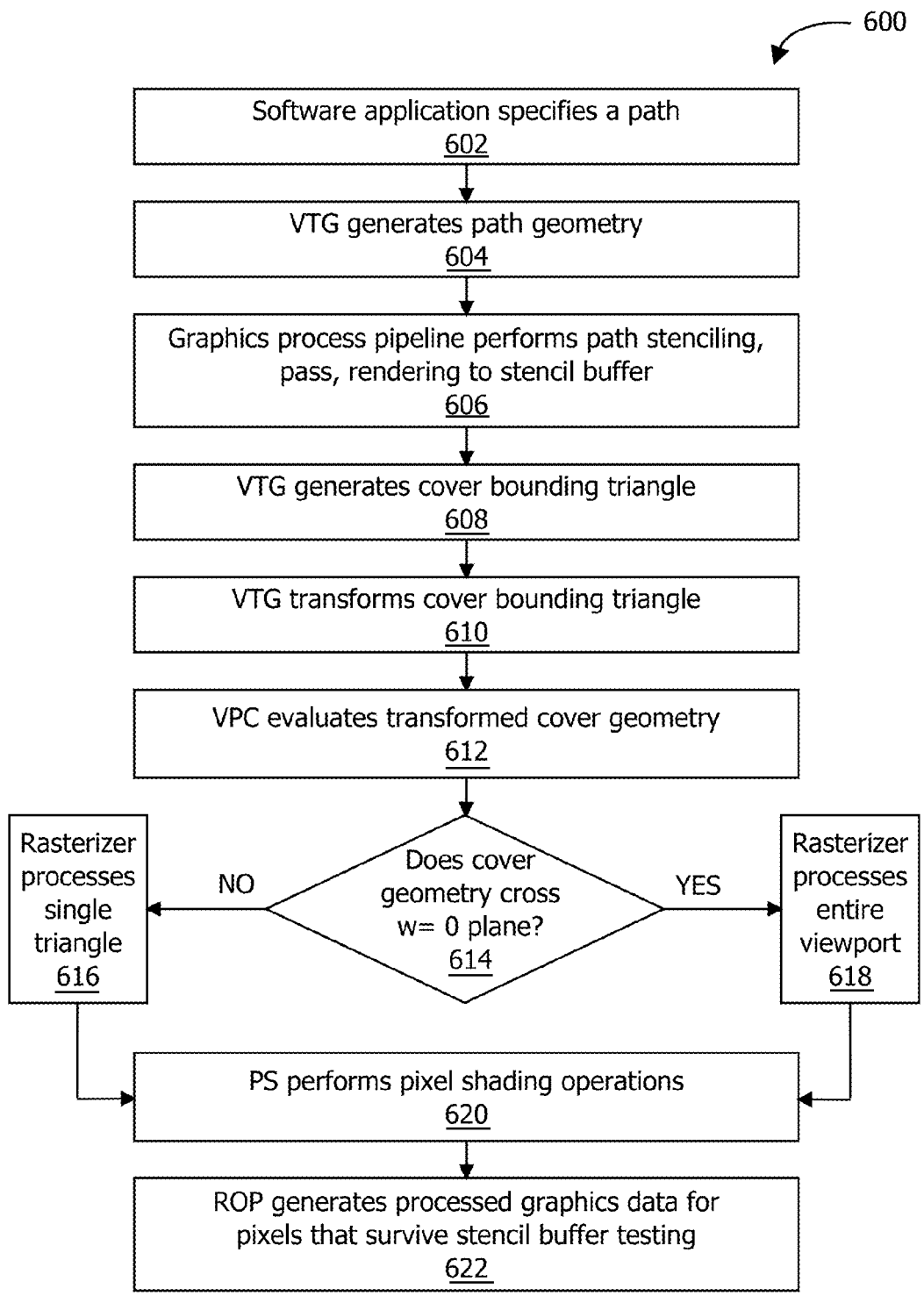
FIG. 6 is a flow diagram of method steps for rendering paths, according to one embodiment of the present invention.

FIG. 6 is a flow diagram of method steps for rendering paths, according to one embodiment of the present invention. Although the method steps are described with reference to the systems of FIGS. 1-5, persons skilled in the art will understand that any system configured to implement the method steps, in any order, falls within the scope of the present invention.

As shown, a method 600 begins at step 602, where the software application 125 specifies a path. At step 604, the VTG unit 365 generates path geometry. The VTG unit 365 may generate the path geometry in any technically feasible fashion. At step 606, the PPU 202 executes a path stenciling pass, rendering values to a stencil buffer. The values in the stencil buffer indicate which coverage samples are covered by the path. More specifically, the PPU 202 maintains N coverage sample per pixel and M color samples per pixel, where N is greater than M. During the path stenciling pass, the coverage samples are updated, but the color samples are not updated.

At step 608, the VTG unit 365 specifies the cover geometry as a particular bounding triangle 405 that conservatively covers the path geometry. By definition, the bounding triangle 405 does not include internal edges. By contrast, prior-art techniques typically implement the cover geometry as a bounding box, convex hull, or similar construct. Consequently, the cover geometry generated by prior-art techniques often includes internal edges.

At step 610 the VTG unit 365 transforms the bounding triangle 405 from path space to clip space, thereby generating the transformed cover geometry 425. The VTG unit 365 may perform this transformation in any technically feasible fashion. At step 612, the VPC unit 370 evaluates the transformed cover geometry 425. Notably, the VPC unit 370 evaluates the transformed cover geometry 425 to determine whether the transformed cover geometry 425 is a target for clipping. In particular, if the transformed cover geometry 370 crosses the w=0 plane, then the VPC unit 370 determines that the transformed cover geometry 425 is a target for clipping. Advantageously, the PPU 202 includes clipless rasterizer support, and the VPC unit 370 is configured to clip only to the w=0 plane. In alternate embodiments, the PPU may not include clipless rasterizer support, and the VPC unit may be configured to clip to one or more additional planes, such as x, y, and z planes. In such embodiments, the VPC unit determines whether the transformed cover geometry is a target for clipping against any of the enabled clipping planes.

At step 614, if the VPC unit 370 determines that the transformed cover geometry 425 does not cross the w=0 plane, then the method 600 proceeds to step 616. At step 616, the rasterizer unit 385 processes the transformed cover geometry 425, and the method 600 proceeds to step 620. Notably, at step 620, the transformed cover geometry 425 is a single, unclipped bounding triangle and, consequently, includes no internal edges.

If, at step 614, the VPC unit 370 determines that the transformed cover geometry 425 crosses the w=0 plane, then the VPC unit 370 sends the fill viewport signal 415 to the rasterizer unit 385, and the method 600 proceeds to step 618. At step 618, the rasterizer unit 385 processes the entire viewport, and the method 600 proceeds to step 620. Advantageously, as persons skilled in the art will recognize, rasterizing the entire viewport introduces no internal seams.

At step 620, the PS unit 390 performs pixel shading operations. At step 622, the ROP unit 395 generates processed graphics data for the pixels that survive stencil buffer testing. As part of step 622, before the ROP unit 395 performs blending and color write operations, the ROP 395 reduces the number of coverage samples to the number of color samples. As previously disclosed herein, during this reduction operation, internal edges may introduce conflation artifacts. Advantageously, the rendered region (either a single bounding triangle or the entire viewport) does not include any internal edges and, therefore, such conflation artifacts are not generated. Further, because the stencil buffer includes data from the preceding path stenciling pass, the ROP unit 395 generates data only for pixels that are covered by the path irrespective of the conservatism inherent in the cover geometry.

In sum, in the path covering rendering pass of a stencil-then-cover operation, the VTG unit defines the cover geometry as a single bounding triangle that conservatively covers the path geometry. Subsequently, the VTG unit transforms the bounding triangle. Although the path is defined in a 2D plane, this transformation facilitates 3D view frustum and user-defined clipping. The VPC unit evaluates the transformed bounding triangle to determine whether the transformed bounding triangle crosses any enabled clip plane. If the VPC determines that the transformed bounding triangle crosses an enabled clip plane, then the VPC sends a "fill entire viewport" signal to the rasterizer unit. This signal configures the rasterizer unit to rasterize all fragments within the viewport irrespective of the bounding triangle. In the absence of the "fill entire viewport" signal, the rasterizer unit rasterizes only the fragments within the bounding triangle. Notably, because the rasterized region is defined either by the bounding triangle or the entire viewport, the rasterized region does not include internal edges. The ROP unit then discards any fragments that are not covered by the path as determined by the prior path stenciling step. Consequently, the ROP unit correctly renders only those samples that are covered by the path.

One advantage of the above approach is that the cover geometry does not introduce conflation artifacts associated with internal edges. In particular, because the cover geometry does not include any internal edges, the cover geometry does not cause background bleeding when rendering using more coverage samples per pixel than color samples per pixel. Further, rendering using more coverage samples than color samples reduces memory consumption and memory bandwidth use compared to prior-art techniques in which the number of color samples is increased to match the number of coverage samples. Consequently, the disclosed approach enables memory-efficient path rendering operations without the conflation artifacts typically associated with prior-art techniques.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A computer-implemented method for rasterizing geometry, the method comprising:
    defining a first bounding primitive that covers first geometry and does not include any internal edges;
    in response to determining that the first bounding primitive intersects an enabled clip plane included in a first plurality of clip planes, generating one or more fragments to fill substantially all of a current viewport;
    defining a second bounding primitive that covers second geometry and does not include any internal edges; and
    in response to determining that the second bounding primitive does not intersect any enabled clip plane included in a second plurality of clip planes, generating one or more fragments to fill the second bounding primitive.

2. The method of claim 1, wherein the first plurality of clip planes includes one or more disabled clip planes.

3. The method of claim 1, wherein the first bounding primitive comprises a bounding triangle.

4. The method of claim 1, wherein the first bounding primitive comprises a full-viewport primitive or a full-frame primitive.

5. The method of claim 1, wherein generating the one or more fragments to fill substantially all of the current viewport comprises a clipper unit transmitting a fill viewport signal to a rasterizer unit, and the rasterizer unit creating the one or more fragments based on the fill viewport signal.

6. The method of claim 1, wherein each vertex of the first bounding primitive is associated with one or more vertex attributes, and at least one of the one or more fragments is associated with one or more fragment attributes that are based on at least one of the one or more vertex attributes.

7. The method of claim 1, wherein generating the one or more fragments to fill the second bounding primitive comprises determining a restricted rasterization region based on a scissor rectangle, and selectively creating the one or more fragments to fill the second bounding primitive based on the restricted rasterization region.

8. The method of claim 1, wherein the first bounding primitive comprises cover geometry generated in a stencil-then-cover rendering operation associated with a path.

9. The method of claim 1, wherein a clipper unit included in a parallel processing unit determines whether the first bounding primitive intersects any enabled clip plane included in the plurality of clip planes.

10. A computer-implemented method for covering a path that comprises at least a portion of a two-dimensional image to be rendered, the method comprising:
   associating one or more color samples with a pixel;
   associating one or more coverage samples with each of the one or more color samples;
   computing a primitive that bounds the path and does not include any internal edges;
   in response to determining that the primitive intersects an enabled clip plane, setting the primitive to a full-viewport primitive or a full-frame primitive;
   generating one or more fragments to fill the full-viewport primitive or the full-frame primitive, wherein each color sample is associated with at most one of the one or more fragments;
   selecting a first fragment included in the one or more fragments that is associated with a first color sample included in the one or more color samples;
   compositing a value for the first color sample based on the first fragment and the proportion of the one or more coverage samples that are associated with the first color sample.

11. The method of claim 10, wherein the primitive comprises a bounding triangle.

12. The method of claim 10, wherein the enabled clip plane comprises a view frustum clip plane.

13. The method of claim 10, wherein the plurality of clip planes includes one or more disabled clip planes.

14. The method of claim 13, wherein the one or more disabled clip planes include clip planes defined by at least one of x, y, and z coordinates.

15. The method of claim 10, wherein each vertex of the primitive is associated with one or more vertex attributes, and at least one of the one or more fragments is associated with one or more fragment attributes that are based on at least one of the one or more vertex attributes.

16. The method of claim 10, wherein the primitive comprises cover geometry generated in a stencil-then-cover rendering operation.

17. A computing device configured to rasterize geometry, the computing device comprising:
   a memory storing a software application, the software application specifying the geometry; and
   a processor coupled to the memory, the processor:
      defining a first bounding primitive that covers first geometry and does not include any internal edges;
      in response to determining that the first bounding primitive intersects an enabled clip plane included in a first plurality of clip planes, generating one or more fragments to fill substantially all of a current viewport;
      defining a second bounding primitive that covers second geometry and does not include any internal edges; and
      in response to determining that the second bounding primitive does not intersect any enabled clip plane included in a second plurality of clip planes, generating one or more fragments to fill the second bounding primitive.

18. The computing device of claim 17, wherein the first bounding primitive comprises a bounding triangle, a full-viewport primitive, or a full-frame primitive.

* * * * *